No. 656,317. Patented Aug. 21, 1900.
R. E. BURKE.
ROAD GRADING MACHINE.
(Application filed June 7, 1899.)
(No Model.) 6 Sheets—Sheet 1.

WITNESSES:
Edwin G. McKee.
G. M. Anderson

INVENTOR
R. E. Burke
BY
E. W. Anderson
his ATTORNEY.

No. 656,317. Patented Aug. 21, 1900.
R. E. BURKE.
ROAD GRADING MACHINE.
(Application filed June 7, 1899.)
(No Model.) 6 Sheets—Sheet 2.
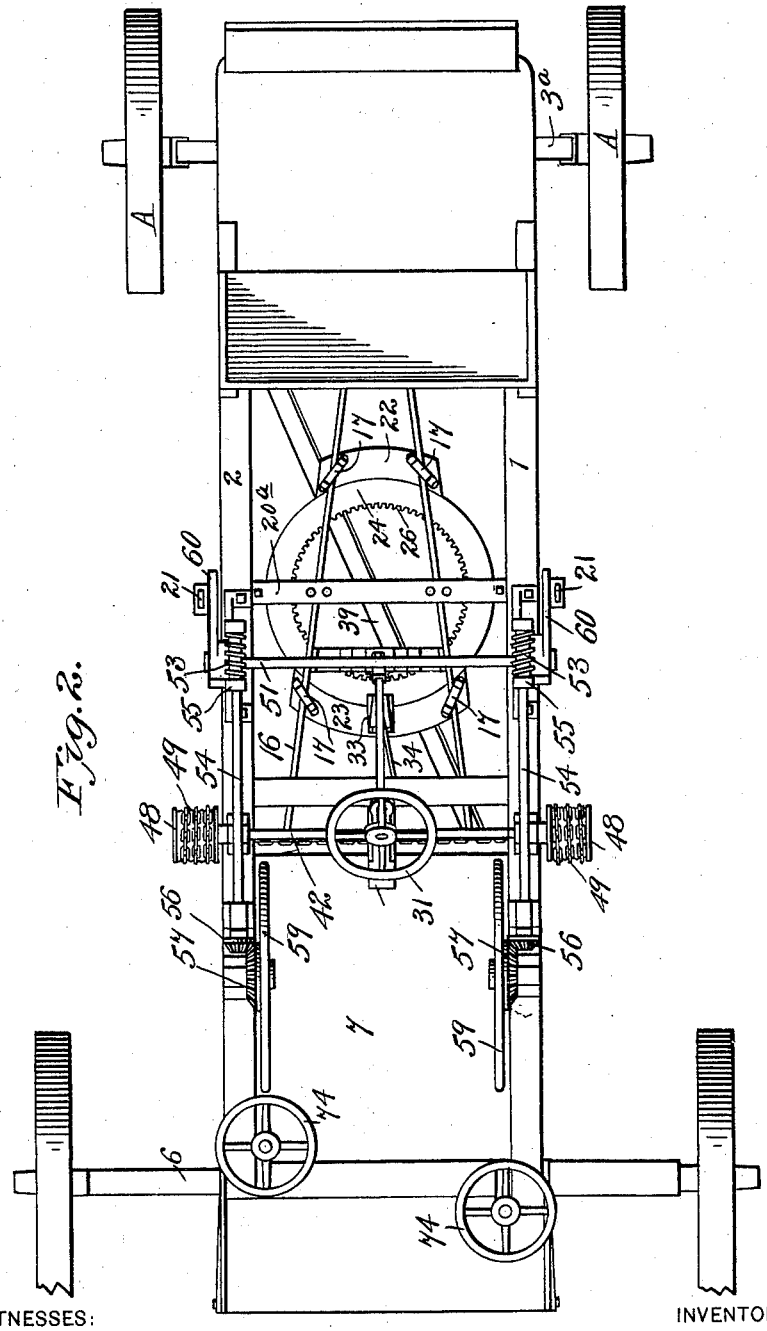
WITNESSES:
Edwin S. McKee.
G. M. Anderson
INVENTOR
R. E. Burke
BY E. W. Anderson.
ATTORNEY.

No. 656,317.  
R. E. BURKE.  
ROAD GRADING MACHINE.  
(Application filed June 7, 1899.)  
Patented Aug. 21, 1900.
(No Model.)
6 Sheets—Sheet 3.
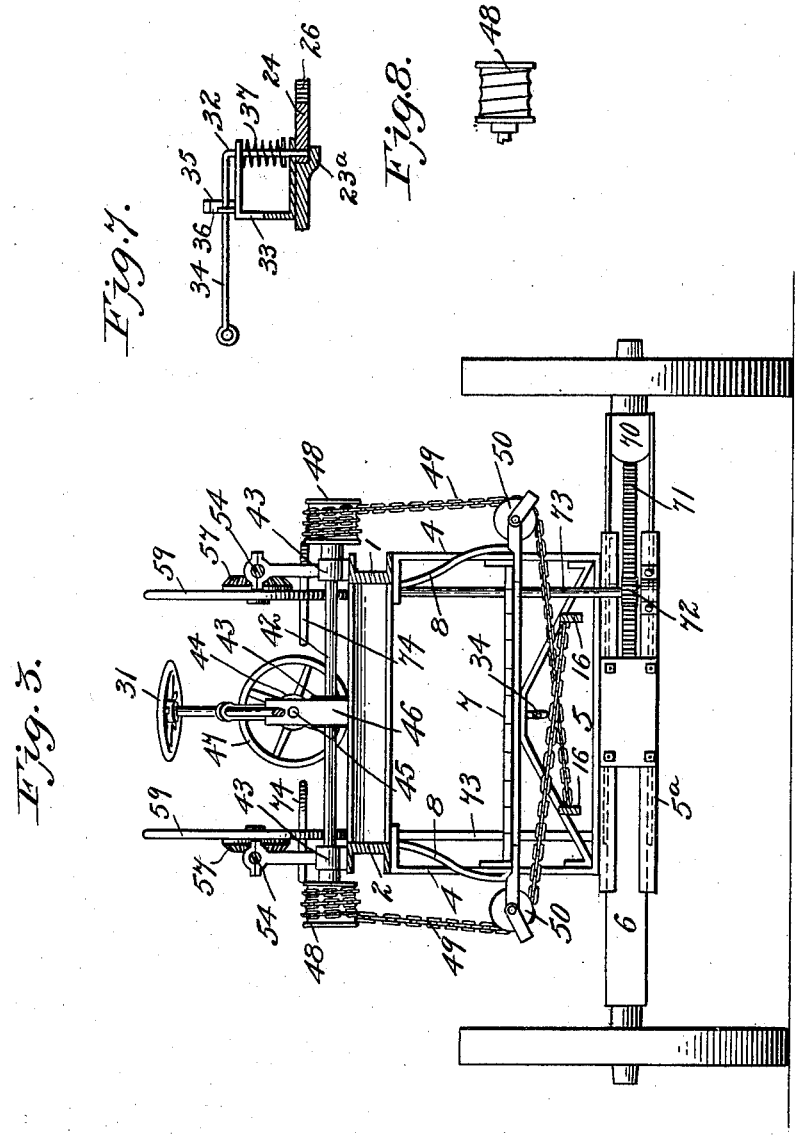
WITNESSES:  
Edwin G. McKee.  
G. M. Anderson
INVENTOR  
R. E. Burke  
BY  
E. W. Anderson  
ATTORNEY.

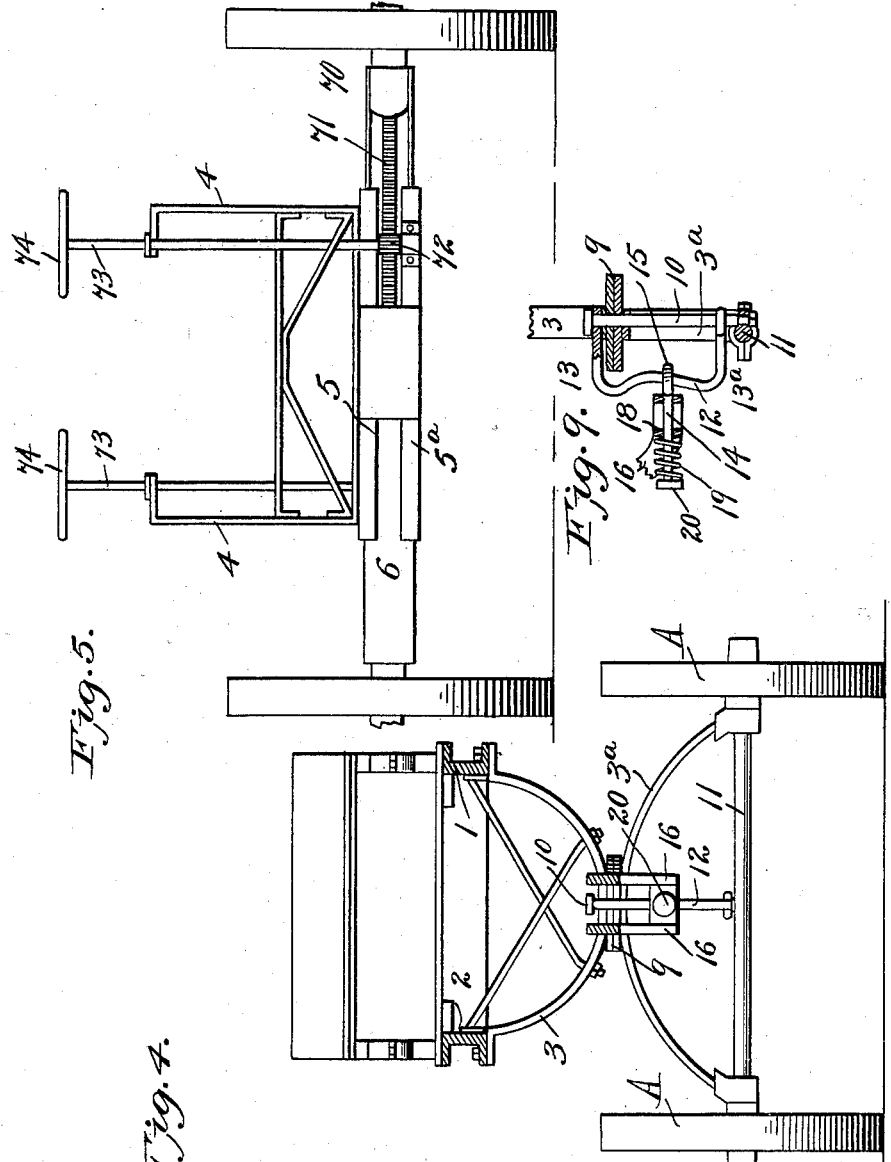

No. 656,317. Patented Aug. 21, 1900.
R. E. BURKE.
ROAD GRADING MACHINE.
(Application filed June 7, 1899.)
(No Model.) 6 Sheets—Sheet 5.

WITNESSES: INVENTOR
Edwin G. McKee. R. E. Burke
G. M. Anderson BY E. W. Anderson
his ATTORNEY.

No. 656,317. Patented Aug. 21, 1900.
R. E. BURKE.
ROAD GRADING MACHINE.
(Application filed June 7, 1899.)
(No Model.) 6 Sheets—Sheet 6.

ATTEST—
Harry L. Amer.
Y. M. Anderson.

INVENTOR.
R. E. Burke.
By E. W. Anderson
his Atty.

UNITED STATES PATENT OFFICE.

ROBERT E. BURKE, OF ANDERSON, INDIANA.

ROAD-GRADING MACHINE.

SPECIFICATION forming part of Letters Patent No. 656,317, dated August 21, 1900.

Application filed June 7, 1899. Serial No. 719,637. (No model.)

*To all whom it may concern:*

Be it known that I, ROBERT E. BURKE, a citizen of the United States, and a resident of Anderson, in the county of Madison and State of Indiana, have invented certain new and useful Improvements in Road-Grading Machines; and I do declare the following to be a full, clear, and exact description of the invention, such as will enable others skilled in the art to which it appertains to make and use the same, reference being had to the accompanying drawings, and to figures of reference marked thereon, which form a part of this specification.

Figure 1:
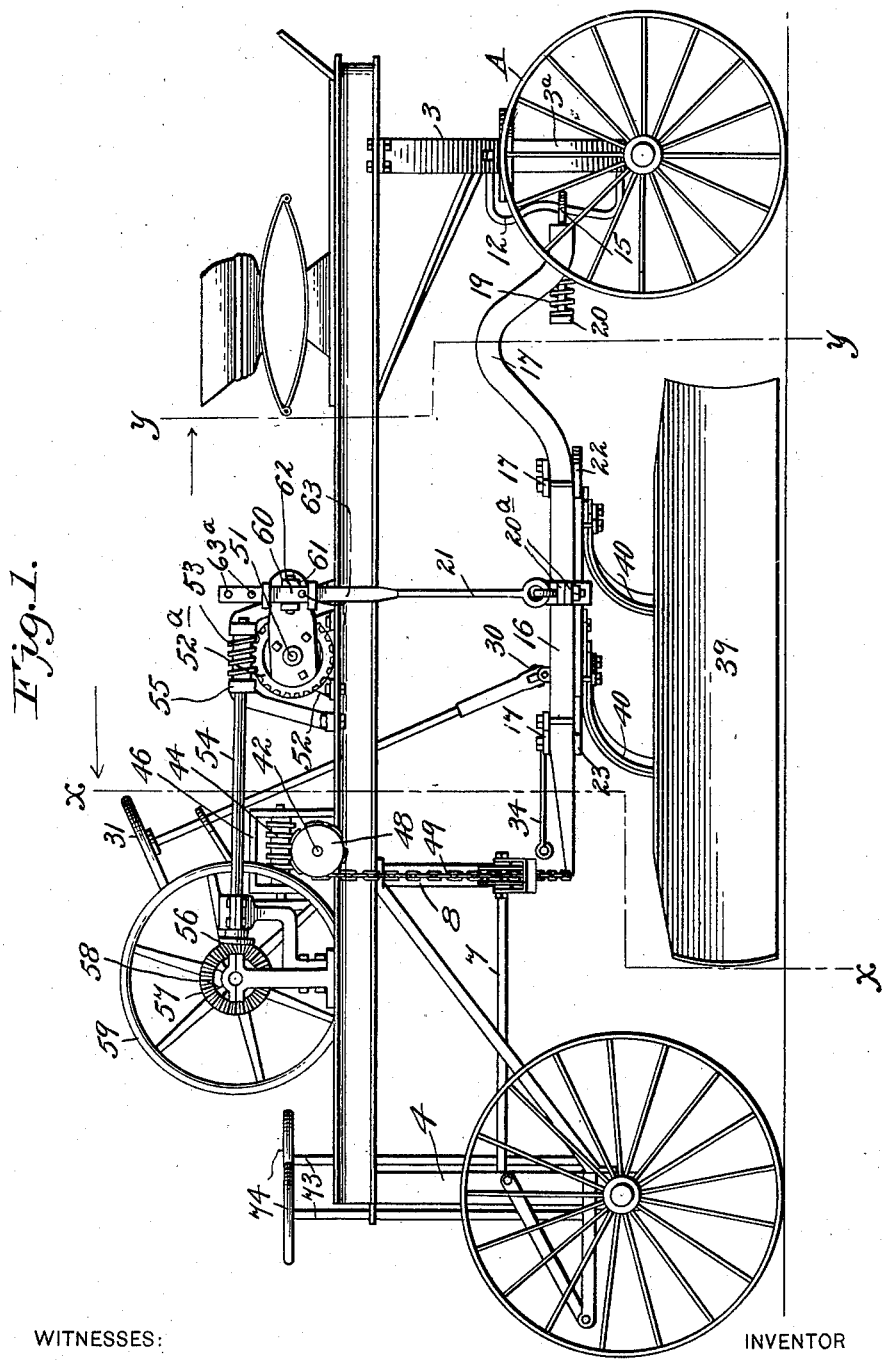
Figure 6:
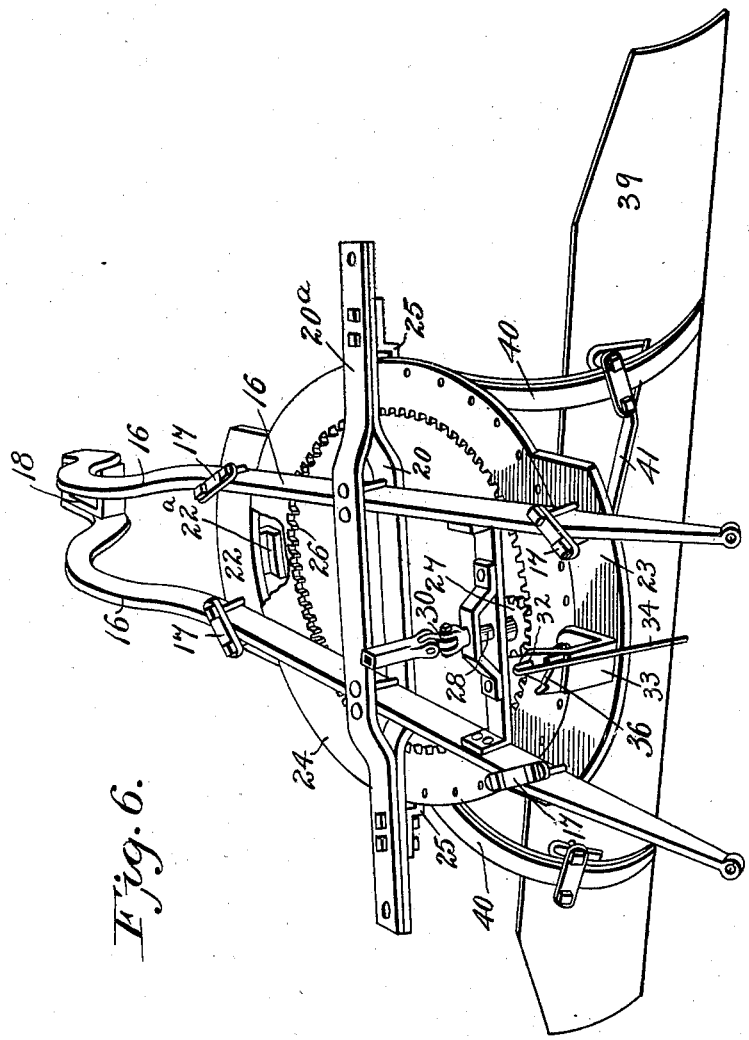
Figure 11:
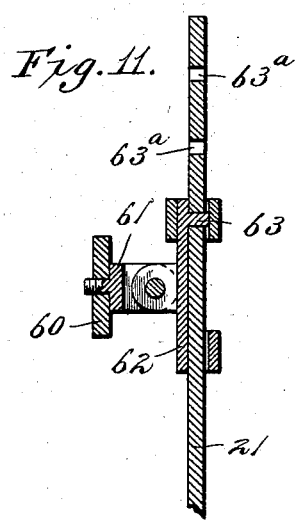
Figure 12:
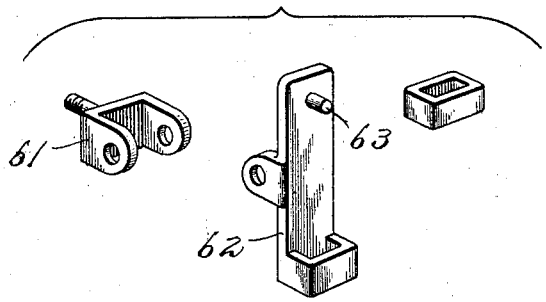

Figure 1 is a side elevation of my improved road-scraper. Fig. 2 is a plan view of the same. Fig. 3 is a section on the line $x\ x$, Fig. 1. Fig. 4 is a section on line $y\ y$, Fig. 1. Fig. 5 is a partial rear end view. Fig. 6 is a perspective view of the scraper-blade and its carrying devices. Fig. 7 is a detail sectional view of the locking device. Fig. 8 is a detail view of one of the chain-winding drums. Fig. 9 is a detail sectional view showing the draw-bolt connection. Fig. 10 is a cross-section of the rear axle. Fig. 11 is a sectional view showing the connection of the crank-arms 60 and rods 21. Fig. 12 shows the parts for effecting such connection in detail.

This invention has relation to certain new and useful improvements in road-grading machines or scrapers. In machines of this character it is essential to provide means by which the scraper-blade may be readily supported and manipulated for the purpose of raising or lowering it or to swing it laterally or diagonally to the longitudinal draft of the machine without the necessity for the operator leaving the platform, while at the same time it must have sufficient rigidity to meet and overcome the resistance of hard impacted earth interposed to its action. It is also desirable that the lateral play of the scraper blade or bar shall be as great as possible, so that wider areas of surface may be covered and reduced to the desired grade or level. In machines of this class heretofore known and used these essentials have not been satisfactorily obtained or provided for, owing in part to the principles upon which they have been constructed and in part to the fact that they have employed a large number and complication of parts and mechanical details.

The objects of the present invention are to overcome the objections heretofore found to exist and to provide a machine in which the essential features above mentioned are provided and obtained in a practical and efficient manner by means of simple mechanical character and different in principle from the prior devices and to provide a machine in which is provided the maximum amount of lateral play of the scraper bar or blade, in which the manipulation of said bar or blade is secured with a minimum expenditure of power, and in which the cost of construction is materially reduced. Other minor objects will hereinafter appear. These objects I attain by the means hereinafter described, illustrated in the accompanying drawings, and pointed out in the appended claims.

In constructing the framework of my improved machines I employ opposite longitudinally-disposed parallel side beams 1 and 2, preferably of channel-steel, whose front end portions rest upon and are secured to the ends of a downwardly-arched bolster 3, an upwardly-arched bolster 3ª, having bearings upon the forward axle, being connected to said first-named bolster by the king-bolt 10, washers 9 being placed between said bolsters. At their rear ends said beams rest upon and are secured to the upper ends of vertical standards 4, forming part of a frame 5, which is slidably mounted on the rear axle 6.

7 is an operator's platform, which is secured at its rear end to the frame 5 and at its forward end is supported by arms or brackets 8, which depend from the under side of the said beams.

12 is a bail which is attached to and held in place by the king-bolt. Said bail is formed with a half-loop 13 and bend 13ª for the purpose of preventing vertical play of a draw-rod 14. The rod 14 has an eye 15 at its forward end which engages the said bail intermediate of said loop and bend.

16 designates two rearwardly-divergent longitudinally-extending bars arched near their forward ends, as indicated at 17, to provide a cut-under for the forward traction-wheels A as they are turned transversely to the line of draft in making a sharp turn with the machine. Between the forward ends of said bars is a head-block 18, through which the draw-rod 14 loosely passes, its rear portion being encircled by a stiff spiral spring 19, interposed between a nut or head 20 on said rod and the head-block or other suitable abutment.

20$^a$ designates a pair of transverse bars, one above the other and bolted together at their end portions, their intermediate portions being bent or spread vertically to receive between them the bars 16 at the intermediate portions of the latter. Loosely connected to the end portions of the bars 20$^a$ are vertical supporting-rods 21.

22 and 23 designate two separated segmental or curved bearing-plates, which are secured to the under side of the bars 16 by means of clips 17.

24 is a flat circle-plate which is placed between the plates 22 and 23, against which it bears at diametrically-opposite portions of its periphery, said plates 22 and 23 having the lips 22$^a$ 23$^a$, which engage the under side of said plate and afford a bearing and support therefor. Said circle-plate also has lateral bearings and support in lugs 25 on the transverse bars 20$^a$.

26 is an internal toothed rack upon the inner periphery of the circle-plate 24 and engaged by a pinion 27 on a shaft 28, whose lower end portion is journaled in a bracket 29, secured to and extending transversely between the divergent bars 16. Said shaft is formed with a joint 30 a short distance above said bracket, and it extends obliquely upward and rearward to a point above the beams 1 and 2 and over the operator's platform, its upper end being provided with a hand-wheel 31. The upper portion of said rod also has a telescopic section rigidly connected, however, with respect to rotary movement, its purpose being to compensate for vertical adjustments of the scraper.

32 is a locking-bolt for the circle-plate 24. This bolt is pivotally seated in a bearing in a clip or bracket 33, secured to the segmental plate 3. Said bolt is provided with a lever-arm 34, which extends rearwardly toward the operator's platform and within reach of the operator's foot. This lever is provided with a rest 35, having an inclined notched bearing-surface 36. When the lever is moved to the left, it rides up the inclined surface 36 and drops into the notch thereof by the action of a spring 37, the bolt 32 being raised out of engagement with one of a series of perforations 38 in the circle-plate 24, with which it engages in notched position. It will be readily seen that the operator standing on the platform 7 is enabled through the wheel 31 and shaft 28 to exert a very powerful and effective leverage on the circle-plate to turn it to the right or left to the desired extent. Owing to the limited area of the bearings and supports 22$^a$, 23$^a$, and 25 there is comparatively little friction. The lock described provides means for securing said plate at any point in its revolution.

39 designates the scraper-blade, which is carried by the circle-plate 24 through the curved arms 40, as shown, said arms at their upper ends being rigidly secured to the circle-plate. 41 denotes braces for the arms 40.

42 designates a transverse shaft which is journaled in bearings 43 on the beams 1 and 2 near the rear end of the machine. On the central portion of said shaft is a worm-wheel 43, which meshes with a boxed worm 44 on a short shaft 45 at right angles to the shaft 42 and journaled in a bracket 46.

47 is a hand-wheel on the worm-shaft 45, said wheel being over the platform 7.

On each end of the shaft 42 is a spirally-grooved drum 48, and to each of these drums is connected one end of a chain 49. The two chains pass downwardly from these drums at the respective sides of the machine to and under grooved pulleys 50, which are supported at the forward corners of the platform 7 from the brackets 8. From these pulleys the chains pass inwardly and loosely cross each other, the chain from the drum on the left-hand end of the shaft 42 being connected to the rear end of right-hand bar 16, while the chain from the right-hand end of said shaft is connected to the bar 16 at the left side of the machine. The spiral grooves of the two drums 48 are counterparts, but run in opposite directions, so that when the shaft 42 is actuated by turning the hand-wheel 47 the slack produced in the chain at that side toward which the scraper is moved will be taken up, while the opposite chain will be paid out.

51 is a transverse shaft which is journaled at 52 in supports attached to the beams 1 and 2 at the central portion of the machine. 52 are worm-wheels which are secured on the outer end portions of said shaft 51 and are respectively engaged by worms 53 on longitudinally and laterally disposed shafts 54, supported in bearings 55. On the rear end of each shaft 54 is a bevel toothed pinion 56, which meshes with a bevel gear-wheel 57, fast to the hub 58 of a hand-wheel 59. On each end of the shaft 51 is a forwardly-extending crank-arm 60, bolted to the worm-wheels 52$^a$, having at their end portions pivoted U-shaped yokes 61, in which are pivoted at right angles to the pivots of the yokes 61 clips 62, having studs 63, which enter perforations 63$^a$ in the upper portion of the vertical supporting-rods 21, before described. It will be seen from the foregoing that by rotating the hand-wheels 59 the shaft 51 will be rotated, and thereby will raise or lower the scraper.

It will readily appear that the operator standing on the platform 7 has full control of the machine and is enabled to exert easily a powerful leverage either to adjust the scraper-blade vertically or laterally with respect to the line of draft of the machine and in a manner to overcome any endwise resistance. The machine can therefore be adjusted so as to make a cut of earth far outside of the line of draft, and by a reverse movement of the hand-wheel 31 the scraper may be almost instantly turned or swung to the opposite side of the machine. If the blade in its forward progress encounters an obstacle, such as a stone or stump, it may be freed by reversing the circle-plate 24 or it may be lifted entirely over the obstacle by the manipulation of the hand-wheels 59. The manner in which the circle-plate is supported allows dust and dirt to free itself from the points of bearing, and thereby overcomes an objection heretofore troublesome. Said circle is also by the devices described held in such a manner as to prevent it from spring.

The axle 5 is preferably made in two overlapping extensible U-shaped sections of steel channel-bars placed inside each other with the transverse arms of the U upon the outside, with a partition between said bars or a strip of iron on center of upper and lower half to separate them, if necessary, and the axle-journals are bolted to the end portions thereof, as seen at 70 in Fig. 3. Said sections are provided with rack-bars 71, secured to the channels thereof, engaged by pinions 72 on hand-shafts 73, operated by hand-wheels 74 and journaled in the frame 5. By operating these shafts either section may be moved laterally upon the other. The frame 5 is constructed, as shown in Fig. 3, with a base portion 5ª, composed of upper and lower U-shaped bars secured by a central plate, through which the axle-sections may slide.

It will be noted that the transverse shaft 42 controlling the lateral adjustment of the scraper-blade and the pulleys 48 thereof are placed above the idlers at the forward part of the platform, whereby the chain 49 between said idlers is always vertical, avoiding danger of such chain becoming disengaged from the idlers through its gravity. It will also be noted that through such construction I am enabled to place the worm-wheel through which said shaft is actuated centrally thereof, and to provide the worm actuating the worm-wheel with a short operating-shaft, and yet have the hand-wheel thereof convenient to the operator, these features being manifestly of great importance in a machine of this character subject to great strains.

Having thus described my invention, what I claim as new, and desire to secure by Letters Patent, is—

1. In a machine of the class described, the vertically-adjustable support, the scraper-blade secured to said support, and means for vertically adjusting said support and blade consisting of gear mechanism having forwardly-extending rods carrying worms, a transverse shaft having worm-wheels at opposite end portions thereof, gearing with said worms, crank-arms at the extremities of said shaft, joint members pivoted to said arms, joint members pivoted to said first-named joint members, and having each a projection, and upwardly-extending rods pivoted to said support and having each a plurality of perforations adapted to adjustably engage said projection, substantially as specified.

2. In a machine of the class described, the vertically-adjustable support, the scraper-blade secured to said support, and means for vertically adjusting said support and blade, consisting of gear mechanism, having a transverse shaft, the gear-wheels at opposite ends of said shaft, the crank-arms of said shaft, bolted to said wheels, the U-shaped joint members pivoted to said arms, the joint members pivoted to said first-named members, and having projections, the upwardly-extending rods pivoted to said support, and having perforations therein adapted to adjustably engage said projections, substantially as specified.

3. In a machine of the class described, the combination with the support pivoted at its forward end to the machine, and carrying the scraper-blade, of means for laterally adjusting said support and blade, comprising the transverse shaft, a gear-wheel mounted centrally thereon, a second gear-wheel meshing with said first-named wheel and having a short shaft, a hand-wheel upon said shaft, pulleys at the ends of said transverse shaft, idlers below said pulleys, and chains or the like connected to said pulleys at one end and passing vertically downward around said idlers and connected to opposite sides of the rear end of said support at their opposite ends, substantially as specified.

4. In a machine of the class described, the rear axle, formed of the extensible interfitting U-shaped channel-bars, substantially as specified.

5. In a machine of the class described, the rear axle, formed of the extensible interfitting U-shaped channel-bars the toothed rack-bars in the channels thereof, and the hand-wheel shafts having pinions which engage the teeth of said bars, substantially as specified.

In testimony whereof I affix my signature in presence of two witnesses.

ROBERT E. BURKE.

Witnesses:
LAURA A. BURKE,
JOSEPH BURKE.